United States Patent [19]

Adams

[11] 3,850,803

[45] Nov. 26, 1974

[54] ATMOSPHERIC PRESSURE FILTER

[76] Inventor: Renard P. Adams, 925 Delaware Ave., Buffalo, N.Y. 14209

[22] Filed: June 27, 1973

[21] Appl. No.: 374,130

[52] U.S. Cl.................. 210/142, 210/333, 210/414
[51] Int. Cl............................................ B01d 33/00
[58] Field of Search .......... 210/330, 332, 333, 329, 210/413, 414

[56] References Cited
UNITED STATES PATENTS
| | | | |
|---|---|---|---|
| 1,689,277 | 10/1928 | Burns | 210/414 X |
| 3,176,846 | 4/1965 | Adams | 210/333 |
| 3,476,248 | 11/1969 | Adams | 210/333 X |
| 3,550,775 | 12/1970 | Cooley | 210/81 |

Primary Examiner—Frank A. Spear, Jr.
Assistant Examiner—Ferris H. Lander
Attorney, Agent, or Firm—Shoemaker and Mattare

[57] ABSTRACT

An atmospheric pressure filter comprising a container for liquid to be filtered, a rotatable, horizontally disposed filter drum mounted for rotation in the container beneath the level of liquid in the container, a plurality of spaced apart, elongate filter elements mounted in the drum and extending lengthwise thereof between opposite ends of the drum to filter the liquid, means connected with the filter drum to rotate the filter drum and to stop the filter drum at predetermined increments of rotation, and cleaning probe means supported adjacent one end of the filter drum for lengthwise insertion into one of the filter elements to progressively clean the filter element over its length when the drum is stopped, said cleaning probe means including means to effect reverse flow of filtered liquid through only a small portion at a time of the filter element to clean the filter element.

16 Claims, 14 Drawing Figures

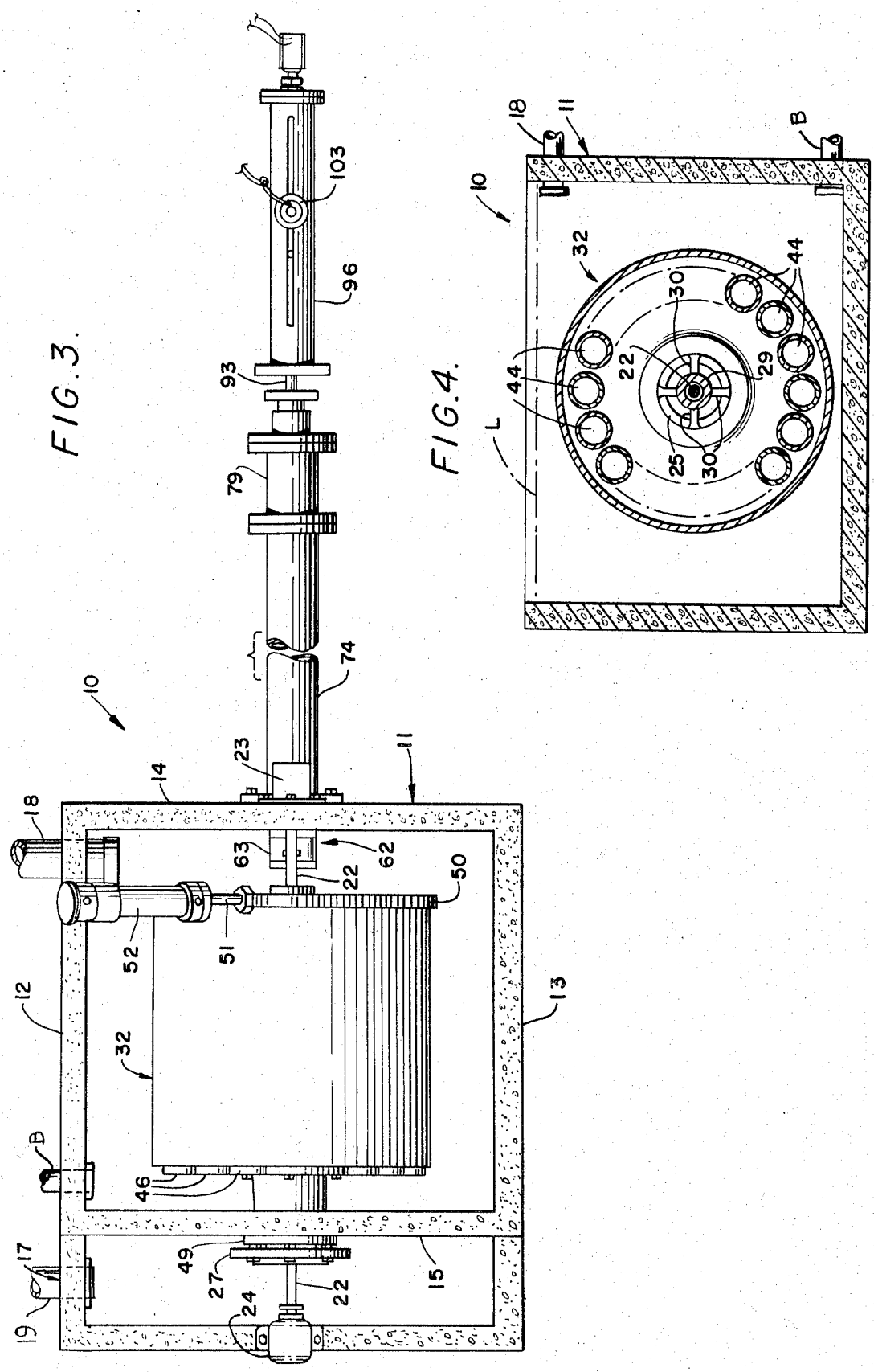

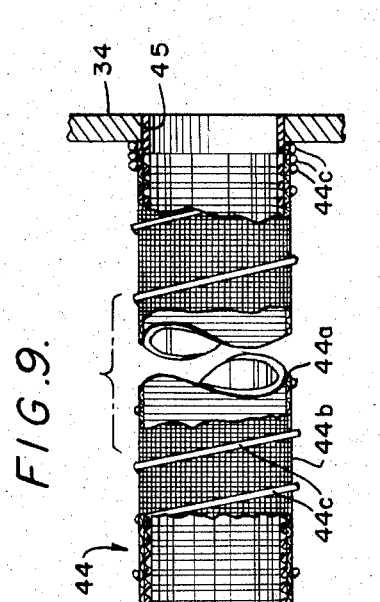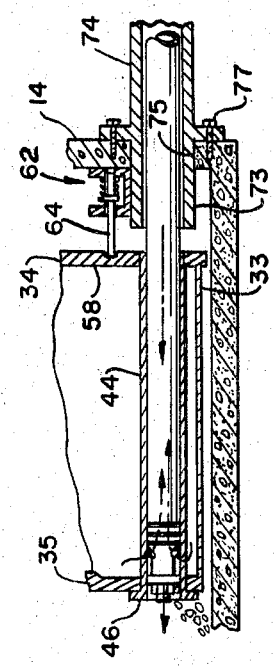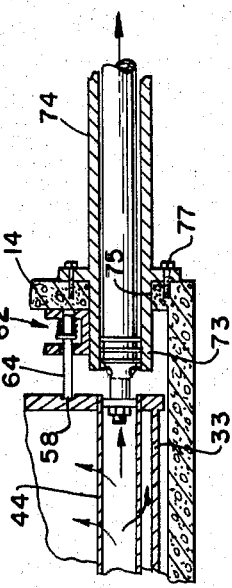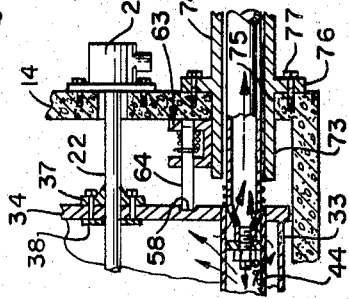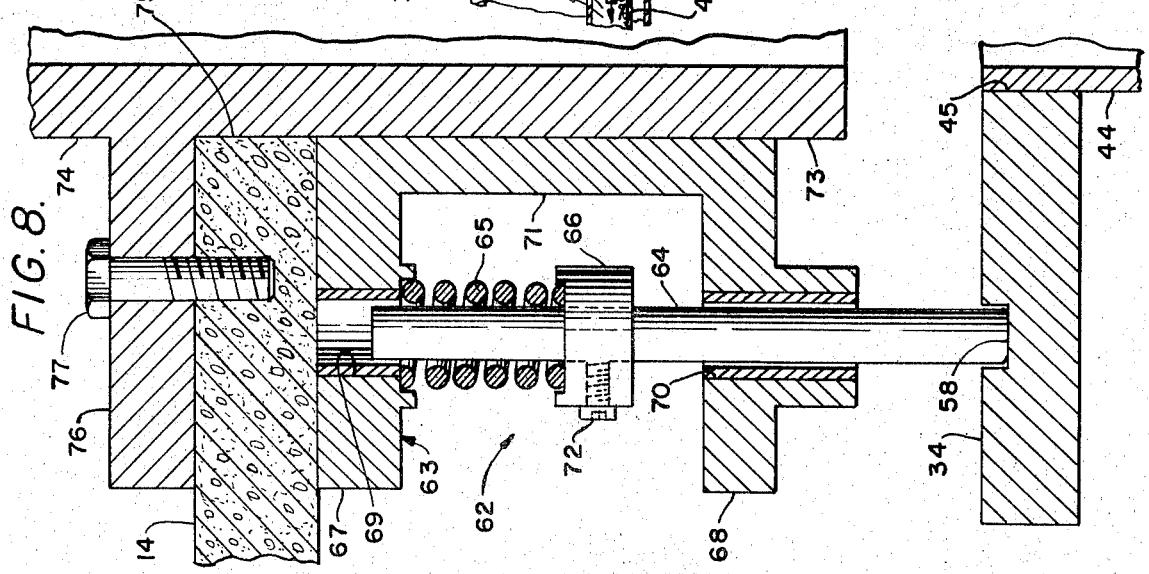

ATMOSPHERIC PRESSURE FILTER

BACKGROUND OF THE INVENTION

This invention relates to atmospheric pressure filters and more particularly, to atmospheric pressure filters of the drum filter type, wherein a plurality of filter elements are mounted in a rotatable drum which is submerged in the liquid to be filtered, and to a means for cleaning the filter elements.

There are various types of conventional filter drums, including those wherein filtration occurs upon flow of liquid inwardly through the sides of the filter elements and with the contaminants thus collected on the outer surfaces of the filter elements, and those wherein filtration occurs from inside the filter elements outwardly thereof so that the contaminants are collected on the inside of the filter elements.

Various cleaning devices are utilized in the prior art for cleaning the filter elements of such prior art devices, including high pressure reverse sprays; but in all of these prior art devices, cleaning of one entire filter element or a plurality of filter elements is accomplished at one time, thus reducing the efficiency of the device.

According to the present invention, an atmospheric pressure filter comprising a rotatable filter drum having a plurality of elongate filter tubes or elements mounted therein is provided, with the filter drum submerged in a liquid to be filtered and with the filter tubes having opposite open ends through which the liquid to be filtered flows to the interior of the tubes and thence through the tubes to the interior of the drum and through an outlet at one end of the drum. Thus, contaminants filtered from the liquid collect on the inner surfaces of the filter tubes.

The present invention is provided with means for rotating the drum and for stopping the drum at predetermined intervals of rotation with at least one of the filter tubes positioned in alignment with an elongate filter tube cleaning probe supported adjacent one open end of the filter tube and operable for lengthwise insertion into the filter tube to engage and push contaminants from the tube through the other open end thereof and to effect reverse flow of water through a small portion only of the length of the tube at a given time but operable to progressively clean the entire length of the tube. With the arrangement of the invention, only a very small amount of backwash liquid is required to affect a high pressure differential across the tube to clean the tube, since only a very small area of the tube is cleaned at a time, and the remaining filter tubes in the drum are operable for continuous filtration while said one tube is being cleaned.

OBJECTS OF THE INVENTION

It is an object of this invention to provide a unique atmospheric pressure filter including a rotatable drum having a plurality of elongate filter tubes or elements supported therein and with means connected with said drum for rotating the filter drum and for stopping rotation of the drum at predetermined intervals with at least one of the filter tubes in alignment with a unique cleaning probe, said probe being inserted into at least one of the filter tubes to progressively clean the filter tube over its entire length with cleaning occurring at only a small portion of the length of the tube at a given time.

BRIEF DESCRIPTION OF THE DRAWINGS

FIG. 3 is a plan view of the filter of FIG. 2.

FIG. 4 is a view in section taken along line 4—4 in FIG. 2.

FIG. 8 is a greatly enlarged sectional view of the stop pin for holding the filter drum in an indexed position.

FIG. 9 is an enlarged view with portions broken away and portions shown in section of one of the filter tubes or elements according to the invention.

FIG. 10 is a fragmentary sectional view showing a cleaning probe being inserted into a filter tube to clean the same.

FIG. 11 is a view similar to FIG. 10 showing the cleaning probe in its forward most position in the filter tube.

FIG. 12 is a view similar to FIG. 11 showing the cleaning probe substantially withdrawn from the filter tube after cleaning of the filter tube.

DETAILED DESCRIPTION OF THE INVENTION

Figure 1:
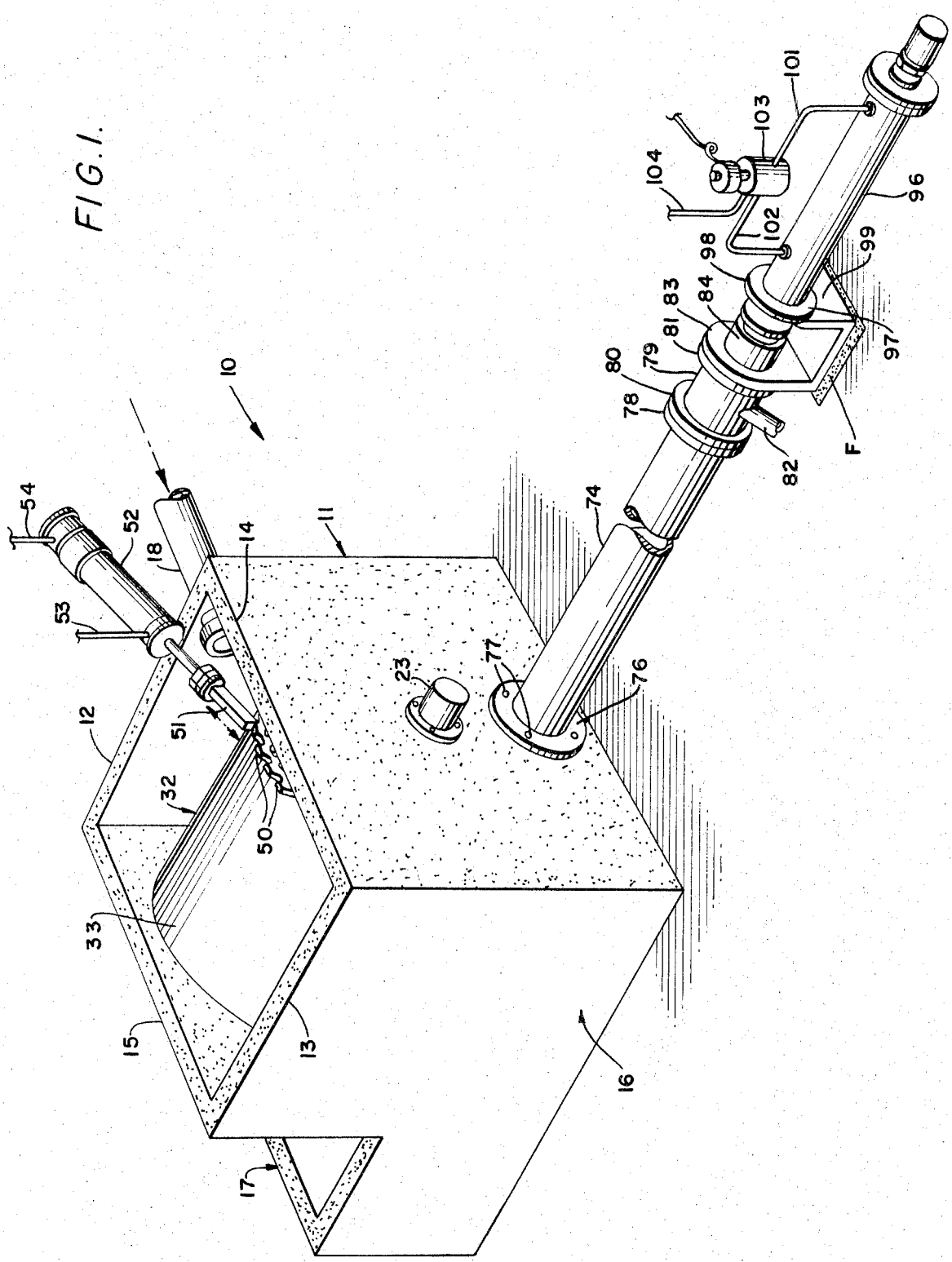
FIG. 1 is a top perspective view of an atmospheric pressure filter according to the invention.

In the drawings, wherein like reference numerals indicate like parts throughout the several views, an atmospheric pressure filter in accordance with the invention is indicated generally at 10 and comprises a container or tank 11 made of concrete, fiberglass, wood or other suitable material and having a pair of side walls 12 and 13 and opposite end walls 14 and 15 and a bottom 16. A relatively small outlet reservoir 17 is at one end of the container 11, and a raw liquid inlet 18 is in the side wall 12 of container 11 adjacent the upper edge thereof, and a filtered liquid outlet 19 is in one side wall of outlet reservoir 17. A suitable blowdown outlet B is also provided in the container 11 in the side wall 12 thereof adjacent the bottom thereof for purging the raw liquid compartment 11 of solids pushed out of the filter tubes.

Figure 2:
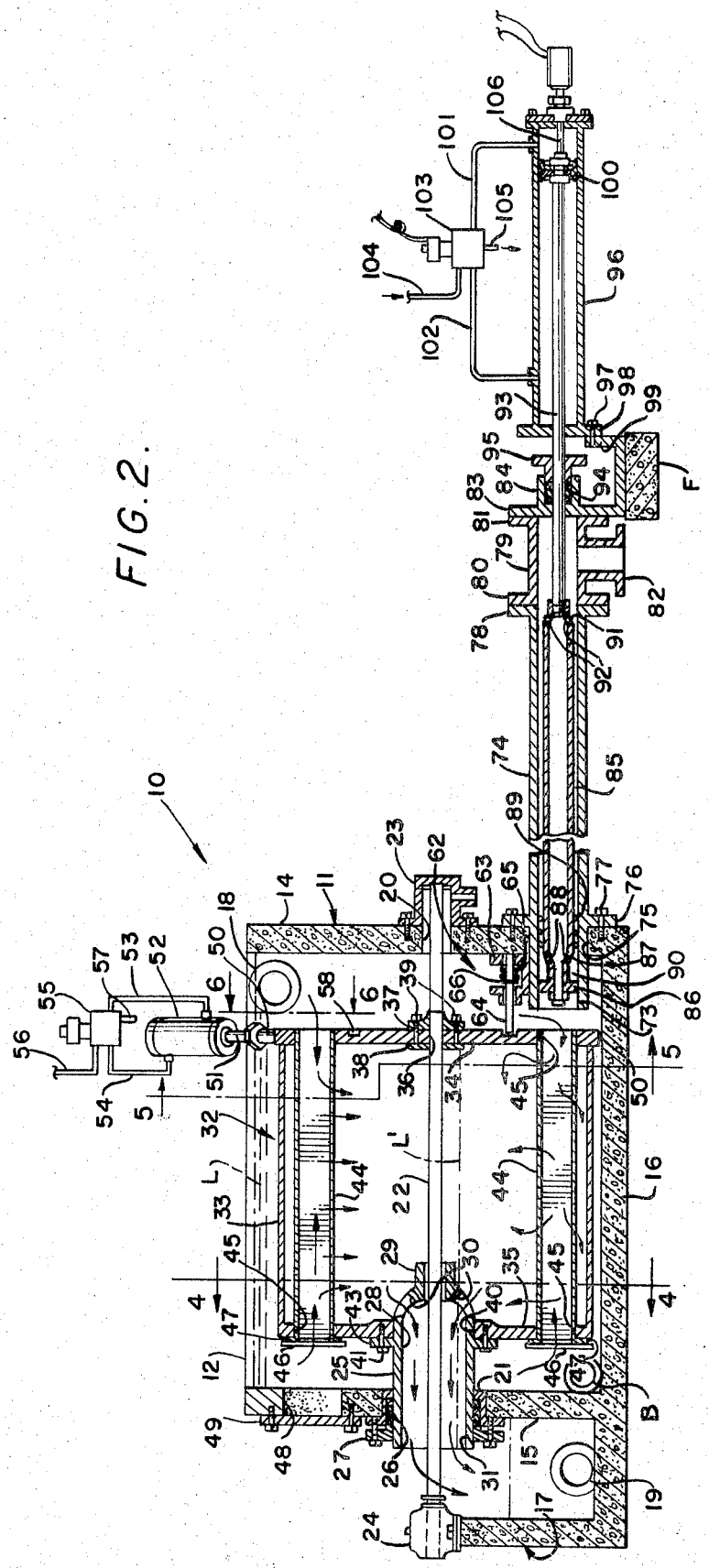
FIG. 2 is a vertical sectional view of the filter of FIG. 1.
Figure 5:
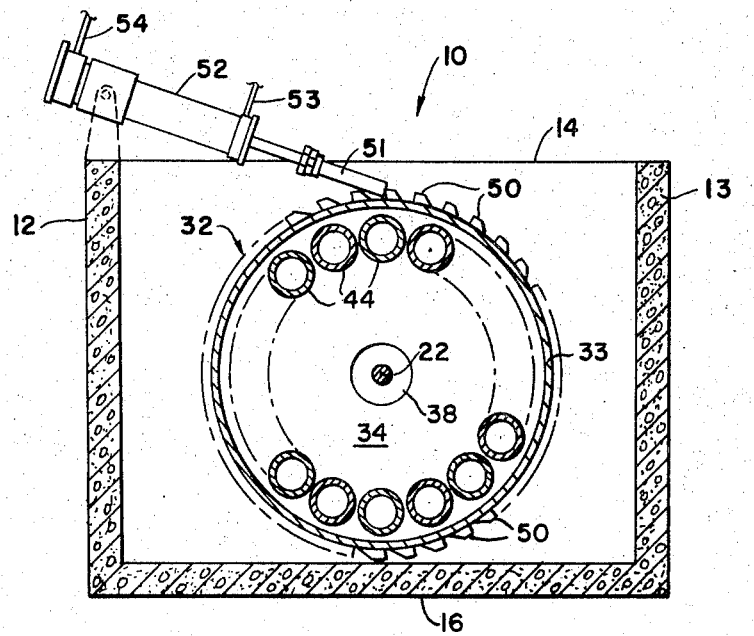
FIG. 5 is a view in section taken along line 5—5 in FIG. 2.
Figure 6:
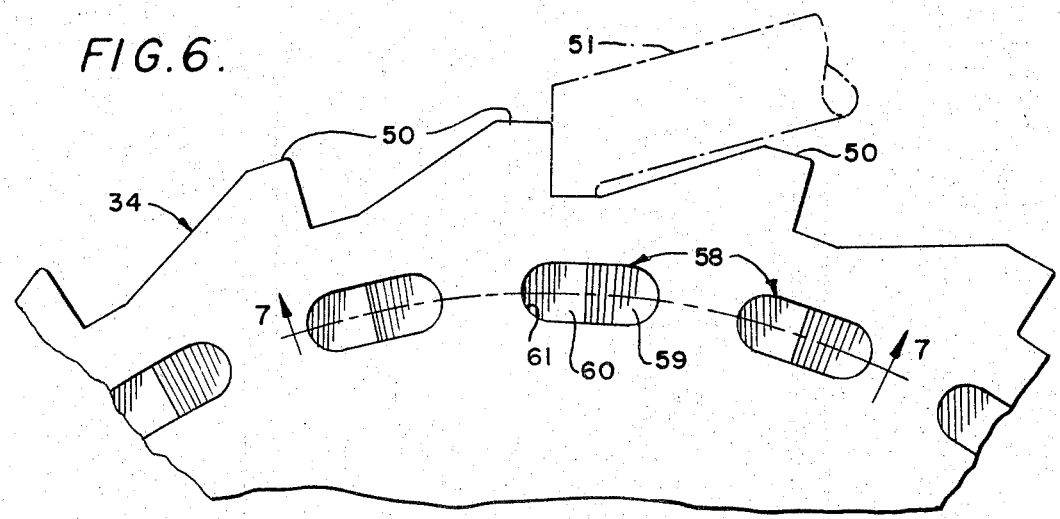
FIG. 6 is a greatly enlarged fragmentary view in section taken along line 6—6 in FIG. 2.
Figure 7:
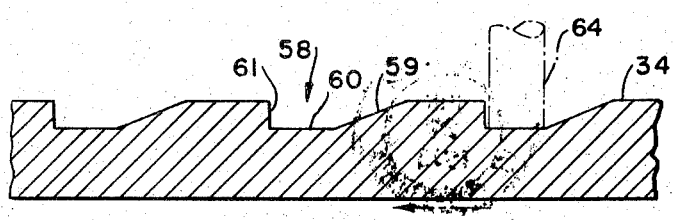
FIG. 7 is a greatly enlarged fragmentary sectional view taken along line 7—7 of FIG. 6 and illustrating the cooperation between a stop pin and the notches or grooves in the drum.

Suitable control means (not shown) are provided attached to the inlet 18 and outlet 19 for maintaining a water level L in the container near the top thereof as seen in FIG. 2.

Openings 20 and 21 are provided in the end walls 14 and 15, respectively, near the centers thereof and an elongate, rotatable drum support shaft 22 extends at its opposite ends through the openings 20 and 21 and is supported at one end thereof in a suitable bearing 23 on the outside of end wall 14 and in a suitable radial and thrust bearing 24 supported on top of an end wall of the outlet reservoir 17.

The opening 21 in wall 15 is substantially larger than opening 20 in wall 14 and an enlarged, elongate tubular outlet fitting 25 is rotatably mounted in the opening 21 and is sealed thereto by a suitable packing material 26 maintained in position by a packing retaining ring 27.

Outlet fitting 25 has a hollow interior 28 and a closed inner end 29 positioned in closely surrounding relationship to the support shaft 22 with a plurality of openings 30 extended through the closed end thereof and an open outer end 31 positioned exteriorly of end wall 15 for discharging filtered liquid into the outlet reservoir 17. A rotatable filter drum 32 is supported for rotation with the support shaft 22 and comprises a tubular wall 33 closed at its opposite ends by liquid impervious end walls 34 and 35. The support shaft 22 extends through an opening 36 in the end wall 34 and a pair of clamping and sealing plates or collars 37 and 38 are secured to the shaft on opposite sides of the end wall 34 and are secured to the end wall by means of bolts or the like 39 extended through the clamping plates and through the end wall 34. The end wall 35 has a central opening 40 therethrough in which the tubular outlet fitting 25 is received and secured by means of a plurality of bolts or the like 41 extended through an annular flange 43 on the outer surface of the fitting 25 and into the end wall 35 of the drum 32.

A plurality of elongate open ended liquid pervious filter tubes or elements 44 extend at their opposite open ends through aligned openings 45 in the end walls 34 and 35 adjacent the peripheries thereof and spaced inwardly from the liquid impervious tubular side wall 33 and secured in position by means of tube pertaining rings 46 engaged against annular flanges 47 on one of the open ends of the filter tubes 44.

An enlarged opening 48 is provided in the end wall 15 in alignment with an upper most filter tube 44 adjacent the top of the horizontally disposed drum 32, and the opening is normally closed by a closure plate 49 so that the plate 49 may be removed and the filter tubes 44 withdrawn from the filter drum through the opening 48, for service or replacement of the filter tubes.

A plurality of radially projecting drum actuating teeth 50 are on the outer peripheral surface of end wall 34 in a position to be engaged by a reciprocating actuator 51 operated from a suitable pneumatic or hydraulic piston and cylinder arrangement 52 having fluid lines 53 and 54 connected with opposite ends thereof, respectively, and controlled from a suitable solenoid valve 55 having a source of air connected thereto through a conduit 56 and a suitable exhaust conduit 57.

A plurality of detent notches 58 are in the outer surface of the end wall 34 radially inwardly from the filter tubes or elements 44, and each of the detent notches 58 includes an inclined exit end wall 59, a flat bottom wall 60 and a perpendicular end wall 61. A stop pin or detent arrangement 62 is supported on the inside surface of end wall 14 adjacent the bottom thereof and includes a generally U-shaped support bracket 63 having an elongate reciprocable stop pin or detent 64 supported therein and biased outwardly toward the end wall 34 by means of a coil spring 65 or the like engaged between one end of the U-shaped bracket 63 and a collar 66 secured on the pin 64 between the ends thereof. Accordingly, as the drum 32 rotates, the pin 64 slides along the inclined surfaces 59 of notches or grooves 58, and the size and spacing of the notches is selected such that in cooperation with movement of the actuator 51 and the size and spacing of the actuator teeth 50 the pin 64 drops behind the vertical wall 61 of a notch 58 just as the actuator 51 completes a forward pushing stroke against one of the teeth 50 to rotate the drum through a predetermined angle of rotation, and the pin 64 acting against vertical wall 61 prevents reverse rotation of the drum as the actuator 51 is withdrawn for a subsequent pushing operation against another tooth 50.

As seen best in FIG. 8, the U-shaped bracket 63 of the stop or detent arrangement 62 includes a back wall 67 and a front wall 68 having openings 69 and 70 therethrough lined with a suitable bearing liner in which the pin 64 reciprocates. A bottom wall 71 integrally joins the lower ends of the end walls 67 and 68. The collar 68 is adjustably positioned on the pin 64 and is secured in adjusted position by means of a set screw 72 or the like.

The U-shaped support bracket 63 is supported with the end wall 67 in engagement with the inner surface of end wall 14 of container 11 and with the bottom wall 71 thereof supported on the top of the end 73 of a cleaning probe support tube 74 extended through an opening 75 in the lower end of wall 14 and in alignment with a bottom most tube 44 supported in the drum 32 within the container.

An annular collar or flange 76 is on the cleaning probe tube 74, and the tube is secured to the container 11 by means of a plurality of bolts or the like 77 extended through the flange 76 and into the end wall 14.

The cleaning probe support tube 74 extends outwardly away from the end wall 14 a distance substantially equal to or slightly greater than the length of the filter drum 32 and has an outer flanged end 78 suitably secured to a coupling member 79 having flanges 80 and 81 on its opposite ends thereof and a radially extending fitting 82 for connection of the coupling and of the tubular cleaning probe support 74 to a suitable suction pump, not shown.

The flanged coupling member 79 is connected in turn to a substantially L-shaped bracket support 83 supported on a suitable foundation means F, and including a cylindrical projection 84 thereon.

An elongate tubular cleaning probe 85 is reciprocably mounted within the cleaning probe support tube 74 and has an annular entry plug 86 on the forward end thereof of substantially the same diameter as the inner diameter of the support tube 74 and of the filter elements or tubes 44. The cleaning probe 85 has a reduced diameter, necked down forward end portion 87 extending from the entry plug 86 and tapering outwardly to adjacent the inner surface of support tube 74. A plurality of openings 88 extend through the reduced end portion 87 of cleaning probe 74, and a plurality of annular sealing rings 89 are positioned around the cleaning probe 85 immediately rearwardly of the reduced diameter portion to define a sealed reverse flow cleaning zone 90 at the forward end of the probe between the entry plug 86 and the sealing rings 89.

The cleaning probe 85 has a reduced diameter tapered down outer end 91 with a plurality of openings 92 therethrough, and the outer end 91 is threadably engaged or otherwise suitably secured on the end of an elongate actuating shaft 93 which extends through the fitting 79 and through the cylindrical extension 84 on support bracket 83 and is suitably sealed thereto by a packing material 94 held in position by a packing retaining flange 95. The actuating shaft 93 extends into an elongate actuating cylinder 96 supported at one end thereof on the support bracket 83 as by means of a bolt or the like 97 extended through an enlarged annular flange 98 on said one end and into an upstanding flange 99 on the support bracket 83. A suitable piston 100 is secured on the outer end of actuating shaft 93 and pressure fluid lines 101, 102 are connected with opposite ends of the cylinder 96 and with a suitable solenoid valve 103 connected via conduit 104 to a source of pressurized liquid and having an exhaust port or conduit 105. A limited switch means 106 is supported in the outer end of cylinder 96 and positioned to be engaged by the piston 100 at the extreme outer limit of the piston's travel to indicate when the cleaning probe is withdrawn from a filter element or tube 44 and into the cleaning probe support tube 74. The limit switch 106 is suitably operatively connected with control means connected with the rotor drum actuating means 52 so that operation of the rotor drum actuating means to rotate the rotor drum, and operation of the cleaning probe are synchronized so that the cleaning probe is not projected forwardly until the rotor drum is stopped with a filter tube in alignment with the end of the cleaning probe.

As seen best in FIG. 9, each filter element or tube 44 comprises an inner cylindrical support tube 44a of a suitable liquid pervious material and having a suitable filter media covering or wrap 44b disposed therearound, with the filter media wrap or covering held in place by a spirally wound wrapping cord 44c of metal or plastic or the like.

In operation of the apparatus of the invention, a suitable control means, not shown, either automatic or manual, is activated to actuate the solenoid valve 55 to extend actuator rod 51 and thus rotate rotor drum 52 through a predetermined increment of rotation as determined by the number and spacing of the teeth 50. The stop pin 64 slides along the end wall of the drum and drops into one of the detent notches 58 at the end of the stroke of actuator 51 to latch the drum in position to enable the actuator 51 to be retracted. As the actuator 51 reaches its limit of travel to rotate the drum forwardly, a suitable means such as a microswitch or the like is activated to energize the solenoid valve 103 and thus operate the cleaning probe 85 to extend it forwardly into one of the cleaning elements or tubes 44 in alignment therewith.

As seen in FIGS. 10, 11 and 12, the rubber entry plug 86 of the cleaning probe engages and pushes contaminants from the inside surface of the tube through the tube and out the open end thereof; and at the same time, the pump, not shown, connected with fitting 82 causes a reverse flow of the filtered liquid from within the drum and through the sides of the filter tube into the zone 90 between the entry plug and O-rings 89 to effect a high velocity backwash through the tube to thoroughly clean the tube. At the end of its forward stroke, the cleaning probe is actuated to be withdrawn from the filter tube 44 to its original position as seen, for example, in FIG. 2. In its retracted position, the piston 100 engages the microswitch 106 to once again actuate the piston and cylinder assembly 52 to cause a further advancement of the rotor drum to bring another filter tube into alignment with the cleaning probe which is then once more actuated to extend into and clean the subsequent filter tubes.

Figure 13:
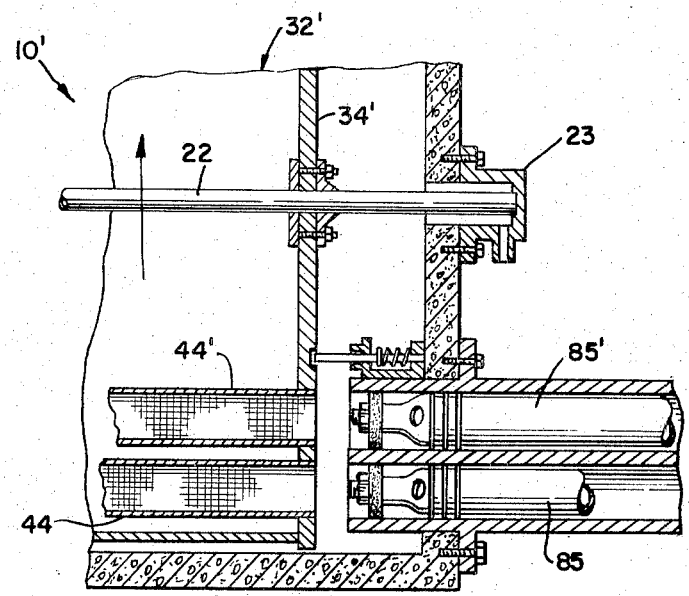
FIG. 13 is a greatly enlarged fragmentary sectional view of a modification of the invention shown in FIG. 12.
Figure 14:
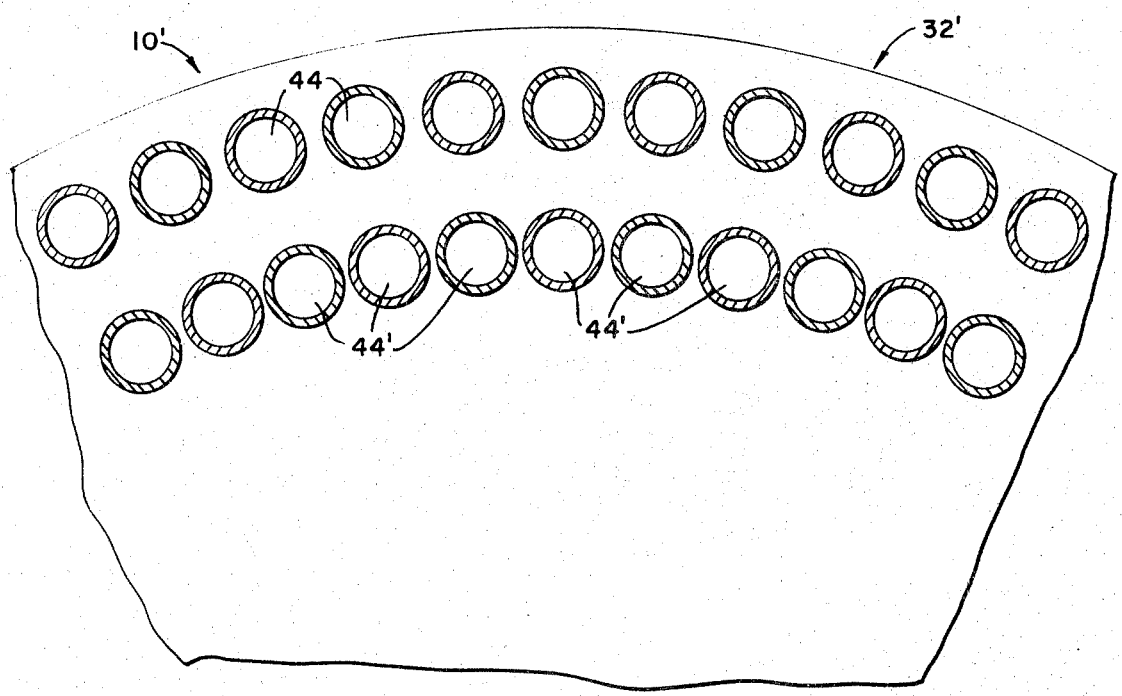
FIG. 14 is a greatly enlarged fragmentary view in section of the modified filter drum according to the invention.

In FIGS. 13 and 14, a modified form of the invention is illustrated at 10' and is substantially identical with the form of the invention illustrated and described with reference to FIGS. 1 through 12 except that rather than one annular row of filter tubes, a pair of concentrically spaced rows of filter tubes are provided in the drum as seen at 44' in FIGS. 13 and 14. Also in this form of the invention, a pair of cleaning probes 85 and 85' are provided for simultaneously cleaning two vertically aligned filter tubes 44 and 44' when the drum is stopped in one of its indexed positions for cleaning of the filter tubes. In all other respects, this form of the invention is identical to that previously illustrated and described.

The rotating filter drum of the invention is in the range of from 4 feet to 8 feet in diameter, and the available head to cause flow of liquid to be filtered through the filter tubes is, therefore, from 2 to 4 feet, depending upon the size of the drum.

Also, the rotor drum of the invention has a length of approximately 5 feet in a preferred construction, and the cleaning probe or probes have a stroke of approximately 5 feet.

The zone 90 between the entry plug and the O-rings of the cleaning probe is approximately ½ inch long, and the pump connected with the cleaning probes creates a suction or head of about 20 to 22 feet. Thus, solids or contaminants are collected on the inside surface of the filter tubes at a pressure differential of from 2 to 4 feet, depending upon the size of the drum; but the pressure of the reverse flow to clean the tubes is on the order of 20 to 22 feet.

Further, as seen best in FIG. 2, the water level within the drum is always maintained at a level L' at least equal to approximately one half the diameter of the drum. Therefore, at all times the tube or tubes undergoing backflushing are surrounded by filtered water or other liquid at a level of pressure equal to ½ the diameter of the drum.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. An atmospheric pressure filter comprising a container for liquid to be filtered, a horizontal tubular filter drum rotatably supported in the container beneath the level of liquid in the container, said drum including a liquid impervious, tubular side wall and opposite spaced apart liquid impervious end walls, a plurality of parallel, spaced apart open ended liquid pervious filter tubes secured at their opposite ends to the drum end walls and extending within the drum the length of the drum between the end walls and opening at their opposite ends outwardly through the end walls for flow of liquid from the container into the open ends of the filter tubes and through the sides of the filter tubes into the drum, an outlet for filtered liquid in one end of the drum, means operatively connected with the drum to rotate the drum and to intermittently stop the drum at predetermined increments of rotation, and at least one filter tube cleaning probe supported adjacent one end of the drum in position to be inserted lengthwise in an open end of a filter tube when the drum is stopped, means connected with the cleaning probe to move the probe into the tube and progressively along the length of the tube to clean the filter tube, said filter tube cleaning probe including means engaging and dislodging contaminants from the inside of the filter tube, said cleaning probe also including means to effect reverse flow of filtered liquid through the filter tube only over a small portion of the length of the fulter tube at a time and movable to progressively clean the filter tube over its entire length and thus requiring only a small amount of backwash liquid to obtain a large pressure differential across the filter tube to clean the filter tube.

2. An atmospheric pressure filter as in claim 1, wherein said container has opposite end walls, opposite side walls and a bottom, an inlet in one of said walls for liquid to be filtered, an outlet for contaminants in one of said walls adjacent a bottom portion thereof, a rotatable drum support shaft extended axially through said drum in supporting relationship thereto and secured to the drum end walls at the centers of the drum end walls, opposite ends of said support shaft extended through openings in the container end walls and rotatably supported in bearing means, said outlet for filtered liquid comprising a tubular outlet fitting secured in one end wall of the drum and extending through the opening in one of the container end walls to convey filtered liquid from the interior of the drum to outside the container.

3. An atmospheric pressure filter as in claim 1, wherein said drum is cylindrical and said means to rotate the drum comprises a plurality of circumferentially spaced, radially projecting teeth on a peripheral marginal surface of one of said end walls, and a reciprocable actuating rod engageable with said teeth, one at a time, to rotate the drum through a predetermined increment of rotation, depending on the travel of said rod and the spacing and number of said teeth.

4. An atmospheric pressure filter as in claim 3, wherein said actuating rod is connected to a piston in a cylinder, means for admitting pressure fluid to said cylinder on alternate opposite sides of said piston to reciprocate said piston and thus said rod.

5. An atmospheric pressure filter as in claim 1, wherein said means to stop the drum at predetermined increments includes a plurality of grooves in an end surface of one of said end walls of said drum, and a reciprocable stop pin extending substantially perpendicular to said one end wall and in alignment with said grooves, said stop pin biased into engagement with said grooves so that as said drum is rotated, said stop pin is movable into a predetermined groove to hold said drum against reverse rotation when said drum is rotated said predetermined increment.

6. An atmospheric pressure filter as in claim 1, wherein said filter tube cleaning probe includes a tubular support housing secured to one end wall of said container and extending through an opening in said one end wall in axial alignment with one of said filter tubes, an elongate tubular cleaning probe reciprocably mounted in said support housing, an entry plug on one end of said cleaning probe of substantially the same diameter as the internal diameter of said filter tube and insertable into said filter tube for sliding movement therealong to engage and dislodge contaminants from the inner surface of the filter tube, a sealing ring means around said cleaning probe spaced from said entry plug and sealingly engageable with the inner surface of said filter tube to define a reverse flow cleaning zone between said entry plug and said sealing ring means, opening means in said cleaning probe in said cleaning zone establishing fluid communication between the cleaning zone and the interior of the tubular cleaning probe, and means connected with the hollow interior of the cleaning probe to establish suction in said cleaning probe and thus in said cleaning zone to effect reverse flow of filtered liquid through said filter tube and into the cleaning zone and thence through said cleaning probe to clean the filter tube.

7. An atmospheric pressure filter as in claim 6, wherein an elongate actuating shaft is connected to the other end of said cleaning probe, said shaft extending into a cylinder and connected to a piston in said cylinder, and means to control admission of pressure fluid to said cylinder on opposite sides of said piston to reciprocate said cleaning probe into and out of said filter tube.

8. An atmospheric pressure filter as in claim 2, wherein said drum is cylindrical and said means to rotate the drum comprises a plurality of circumferentially spaced, radially projecting teeth on a peripheral marginal surface of one of said end walls, and a reciprocable actuating rod engageable with said teeth, one at a time, to rotate the drum through a predetermined increment of rotation, depending on the travel of said rod and the spacing and number of said teeth.

9. An atmospheric pressure filter as in claim 8, wherein said actuating rod is connected to a piston in a cylinder, means for admitting pressure fluid to said cylinder on alternate opposite sides of said piston to reciprocate said piston and thus said rod.

10. An atmospheric pressure filter as in claim 9, wherein said means to stop the drum at predetermined increments includes a plurality of grooves in an end surface of one of said end walls of said drum, and a reciprocable stop pin extending substantially perpendicular to said one end wall and in alignment with said grooves, said stop pin biased into engagement with said grooves so that as said drum is rotated, said stop pin is movable into a predetermined groove to hold said drum against reverse rotation when said drum is rotated said predetermined increment.

11. An atmospheric pressure filter as in claim 10, wherein said filter tube cleaning probe includes a tubular support housing secured to one end wall of said container and extending through an opening in said one end wall in axial alignment with one of said filter tubes, an elongate tubular cleaning probe reciprocably mounted in said support housing, an entry plug on one end of said cleaning probe of substantially the same diameter as the internal diameter of said filter tube and insertable into said filter tube for sliding movement therealong to engage and dislodge contaminants from the inner surface of the filter tube, a sealing ring means around said cleaning probe spaced from said entry plug and sealingly engageable with the inner surface of said filter tube to define a reverse flow cleaning zone between said entry plug and said sealing ring means, opening means in said cleaning probe in said cleaning zone establishing fluid communication between the cleaning zone and the interior of the tubular cleaning probe, and means connected with the hollow interior of the cleaning probe to establish suction in said cleaning probe and thus in said cleaning zone to effect reverse flow of filtered liquid through said filter tube and into the cleaning zone and thence through said cleaning probe to clean the filter tube.

12. An atmospheric pressure filter as in claim 11, wherein an elongate actuating shaft is connected to the other end of said cleaning probe, said shaft extending into a cylinder and connected to a piston in said cylinder, and means to control admission of pressure fluid to said cylinder on opposite sides of said piston to reciprocate said cleaning probe into and out of said filter tube.

13. An atmospheric pressure filter as in claim 12, wherein said means for controlling pressure fluid to said cylinders each comprises a solenoid valve, and means operatively connected to said solenoid valves to operate the solenoid valves in synchronization with one another so that when said actuating rod reaches the limit of its travel to rotate said drum through said predetermined increment and said drum is stopped, said cleaning probe is actuated and inserted into a filter tube, and when said cleaning probe is withdrawn from said filter tube, said actuating rod is operated to advance said drum through another predetermined increment of rotation.

14. An atmospheric pressure filter as in claim 1, wherein there are two concentric rows of filter tubes supported in said housing.

15. An atmospheric pressure filter as in claim 14, wherein a pair of cleaning probes are operatively positioned in alignment with a pair of aligned filter tubes in the inner and outer rows.

16. An atmospheric pressure filter comprising a container for liquid to be filtered, a rotatable, horizontally disposed filter drum mounted for rotation in the container beneath the level of liquid in the container, a plurality of spaced apart, elongate filter elements mounted in the drum and extending lengthwise thereof between opposite ends of the drum to filter the liquid, means connected with the filter drum to rotate the filter drum and to stop the filter drum at predetermined increments of rotation, and cleaning probe means supported adjacent one end of the filter drum for lengthwise insertion into one of the filter elements to progressively clean the filter element over its length when the drum is stopped, said cleaning probe means including means to effect reverse flow of filtered liquid through only a small portion at a time of the filter element and movable along the length of the filter element to progressively clean the entire filter element, thus requiring only a small amount of backwash liquid to clean the filter element.

* * * * *